US012537336B2

(12) United States Patent
Nakamura

(10) Patent No.: US 12,537,336 B2
(45) Date of Patent: Jan. 27, 2026

(54) CONNECTOR

(71) Applicant: Japan Aviation Electronics Industry, Limited, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 293 days.

(21) Appl. No.: 18/484,633

(22) Filed: Oct. 11, 2023

(65) Prior Publication Data

US 2024/0178604 A1 May 30, 2024

(30) Foreign Application Priority Data

Nov. 24, 2022 (JP) ................................ 2022-187363

(51) Int. Cl.
*H01R 13/506* (2006.01)

(52) U.S. Cl.
CPC ................................ *H01R 13/506* (2013.01)

(58) Field of Classification Search
None
See application file for complete search history.

(56) References Cited

U.S. PATENT DOCUMENTS

| | | | | |
|---|---|---|---|---|
| 11,024,993 | B2 * | 6/2021 | Nakamura | H01R 12/616 |
| 11,152,728 | B2 * | 10/2021 | Hashiguchi | H01R 12/88 |
| 11,165,179 | B2 * | 11/2021 | Komoto | H01R 12/777 |
| 2018/0233854 | A1 | 8/2018 | Komoto et al. | |

FOREIGN PATENT DOCUMENTS

JP 2018129244 A 8/2018

* cited by examiner

*Primary Examiner* — Tho D Ta

(74) *Attorney, Agent, or Firm* — MUNCY, GEISSLER, OLDS & LOWE, P.C.

(57) ABSTRACT

A connector includes a plug contact having an axially extending portion that forms at least part of an inner surface of a recess extending along a fitting axis, and an orthogonally extending portion joined to the axially extending portion and extending from a base end of the recess in a direction orthogonal to the fitting axis, and an inner contact that is supported in a state of being partially inserted in the recess, the inner contact having a first contacting portion contacting with the inner surface of the recess, a second contacting portion contacting with the inner surface of the recess on an opposite side from the first contacting portion, and a third contacting portion facing the orthogonally extending portion, part of a connection object of sheet shape being sandwiched between a bottom surface of the orthogonally extending portion and the third contacting portion.

12 Claims, 14 Drawing Sheets

CONNECTOR

BACKGROUND OF THE INVENTION

The present invention relates to a connector, particularly to a connector connected to a sheet type connection object having a conductor exposed on at least one surface of the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode.

As a connector of this type, for example, JP 2018-129244 A discloses a connector as shown in FIG. 25. This connector includes a housing 2 and a base member 3 that are separately disposed on opposite sides of a flexible substrate 1 to sandwich the flexible substrate 1. Tubular portions 4A of contacts 4 are passed through contact through-holes 2A of the housing 2, and flanges 4B of the contacts 4 are sandwiched between the housing 2 and conductors 1A exposed on the top surface of the flexible substrate 1.

In this state, by pushing the base member 3 toward the housing 2, as shown in FIG. 26, a projection 3A of the base member 3 is inserted into a projection accommodating portion 4C of the contact 4 with the flexible substrate 1 being sandwiched therebetween, and an inner surface of the projection accommodating portion 4C makes contact with the conductor 1A with a predetermined contact force, whereby the contact 4 is electrically connected to the conductor 1A.

Further, housing fixing posts 3B formed to project from the base member 3 are press-fitted into post accommodating portions 2B of the housing 2 as shown in FIG. 25, so that the housing 2 and the base member 3 are fixed to each other.

When a wearable device is fitted with the connector disclosed in JP 2018-129244 A, the wearable device can be connected to an electrode formed of a conductor.

However, when the conductor 1A is exposed on the bottom surface of the flexible substrate 1, the connector of JP 2018-129244A is useless for electrically connecting the conductor 1A to the contact 4, disadvantageously.

SUMMARY OF THE INVENTION

The present invention has been made to solve the foregoing problem and aims at providing a connector that enables to make an electrical connection of a contact to a conductor of a connection object regardless of whether the conductor is exposed on the top surface or the bottom surface of the connection object.

A connector according to the present invention comprises:

a plug contact having conductivity and including an axially extending portion that forms at least part of an inner surface of a recessed portion extending along a fitting axis, and an orthogonally extending portion joined to the axially extending portion and extending from a base end of the recessed portion in a direction orthogonal to the fitting axis; and an inner contact having conductivity that is elastically deformable and is supported in a state of being partially inserted in the recessed portion, wherein the inner contact includes: a first contacting portion that makes contact with the inner surface of the recessed portion formed by the axially extending portion and is electrically connected to the plug contact; a second contacting portion that makes contact with the inner surface of the recessed portion on an opposite side from the first contacting portion across the fitting axis at a position closer to the base end of the recessed portion than the first contacting portion; and a third contacting portion extending in a direction orthogonal to the fitting axis and facing the orthogonally extending portion, and wherein part of a connection object of sheet shape having a conductor exposed on at least one surface of the connection object is sandwiched between a bottom surface of the orthogonally extending portion of the plug contact and the third contacting portion of the inner contact in a direction along the fitting axis, the bottom surface of the orthogonally extending portion makes contact with a top surface of the connection object, and the third contacting portion makes contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

DETAILED DESCRIPTION OF THE INVENTION

An embodiment of the present invention is described below based on the accompanying drawings.

Embodiment 1

Figure 1:
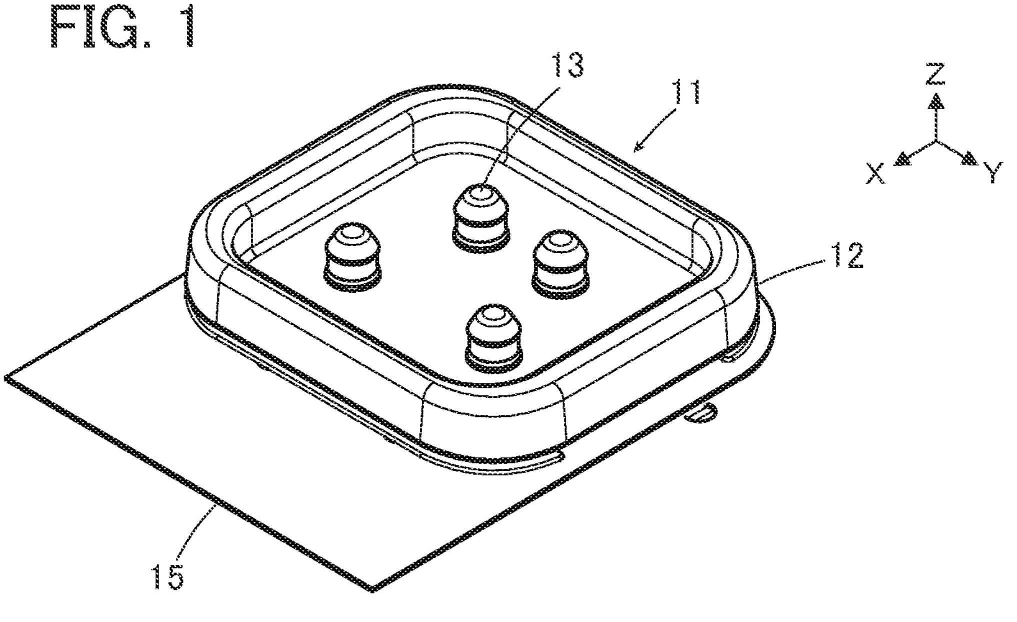
FIG. 1 is a perspective view showing a connector according to Embodiment 1 connected to a connection object.

FIG. 1 shows a connector 11 according to Embodiment 1. The connector 11 is, for instance, used as a garment-side connector for fitting a wearable device and has a housing 12 made of an insulating material. Four plug contacts 13 are retained in the housing 12, and a sheet type conductive member 15 is retained by the housing 12. The sheet type conductive member 15 constitutes a sheet type connection object to which the connector 11 is connected.

The four plug contacts 13 are arranged in two rows parallel to each other and disposed to project perpendicularly to the sheet type conductive member 15.

For convenience, the sheet type conductive member 15 is defined as extending in an XY plane, the arrangement direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
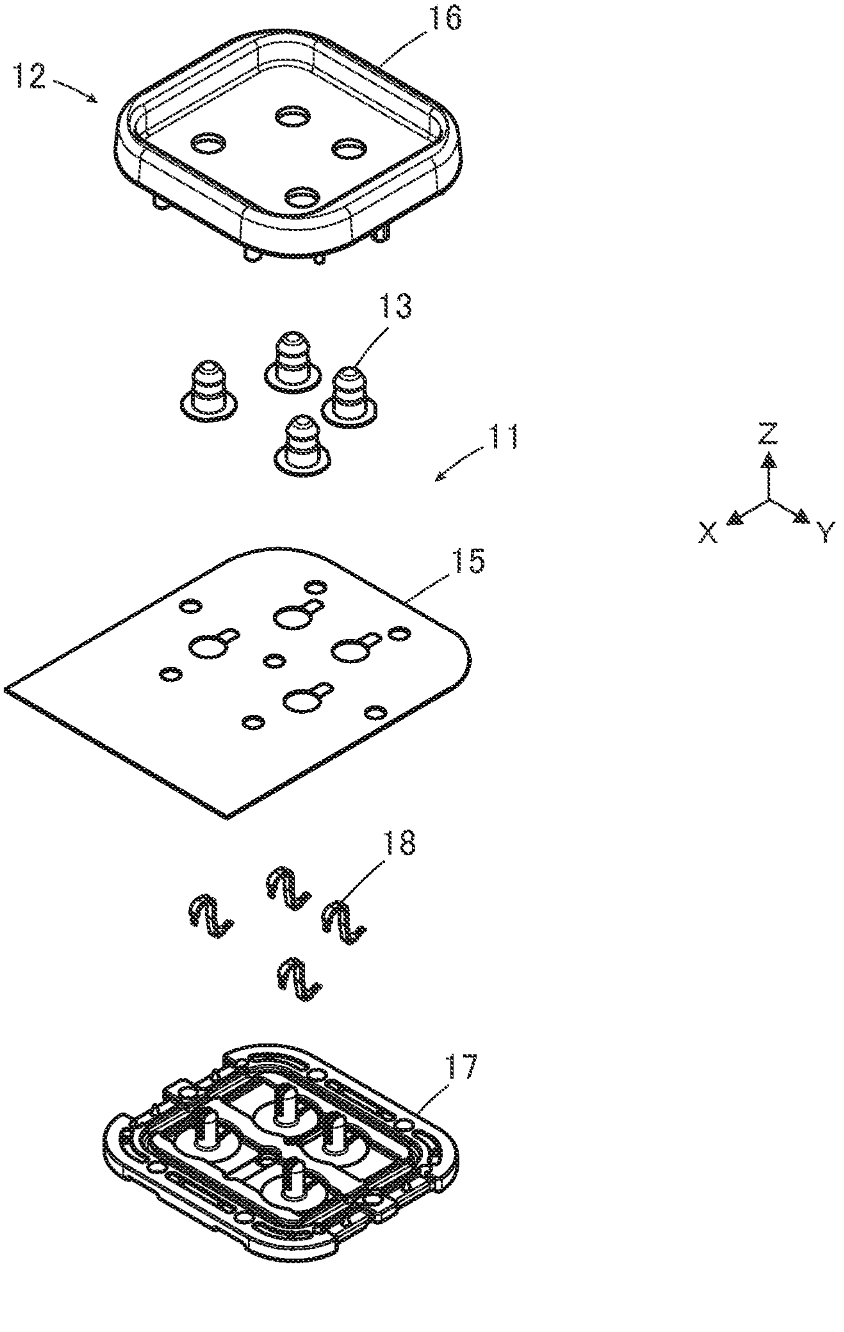
FIG. 2 is an exploded perspective view of the connector according to Embodiment 1.

FIG. 2 shows an exploded perspective view of the connector 11. The connector 11 includes a top insulator 16 and a bottom insulator 17, and these top and bottom insulators 16 and 17 constitute the housing 12.

The four plug contacts 13 are disposed on the −Z direction side of the top insulator 16, and the sheet type conductive member 15 is disposed on the −Z direction side of the four plug contacts 13. Further, four inner contacts 18 are disposed on the −Z direction side of the sheet type conductive member 15, and the bottom insulator 17 is disposed on the −Z direction side of the four inner contacts 18. The four inner contacts 18 separately correspond to the four plug contacts 13.

Figure 3:
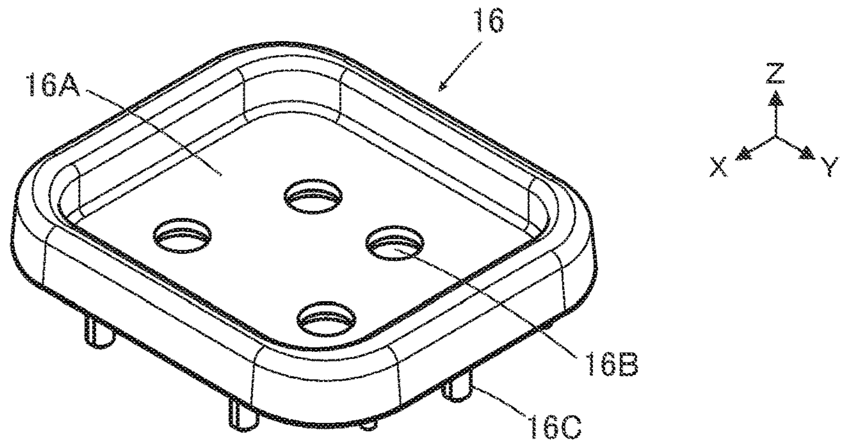
FIG. 3 is a perspective view showing a top insulator used in the connector of Embodiment 1.

As shown in FIG. 3, the top insulator 16 includes a recessed portion 16A opening in the +Z direction, and four contact through-holes 16B formed within the recessed portion 16A. The recessed portion 16A constitutes a counter connector accommodating portion in which part of a counter connector (not shown) is to be accommodated, and the four contact through-holes 16B separately correspond to the four plug contacts 13. In addition, on a surface, facing in the −Z direction, of the top insulator 16, a plurality of bosses 16C are formed to project in the −Z direction.

Figure 4:
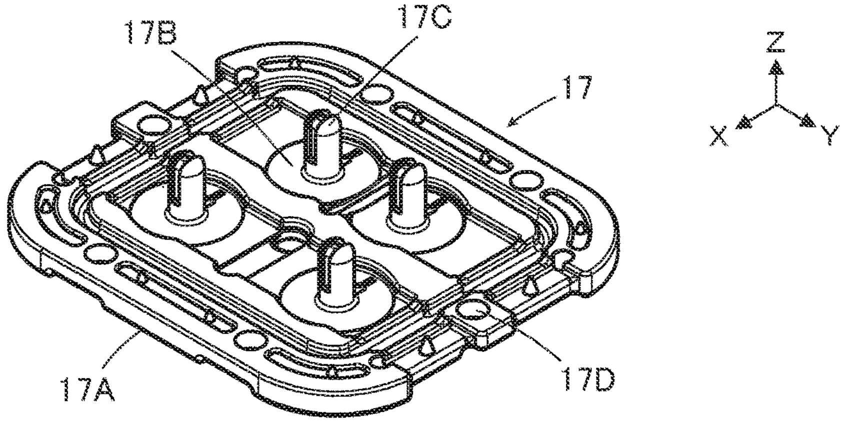
FIG. 4 is a perspective view showing a bottom insulator used in the connector of Embodiment 1.

As shown in FIG. 4, the bottom insulator 17 includes a flat plate portion 17A, and four contact arrangement regions 17B are defined on a top surface, facing in the +Z direction, of the flat plate portion 17A. The contact arrangement region 17B is a circular region for arranging the corresponding plug contact 13 via the sheet type conductive member 15. The four contact arrangement regions 17B are separately provided with four projections 17C projecting in the +Z direction from center parts of the contact arrangement regions 17B.

In addition, the flat plate portion 17A is provided with a plurality of through-holes 17D separately corresponding to the plurality of bosses 16C of the top insulator 16.

Figure 5:
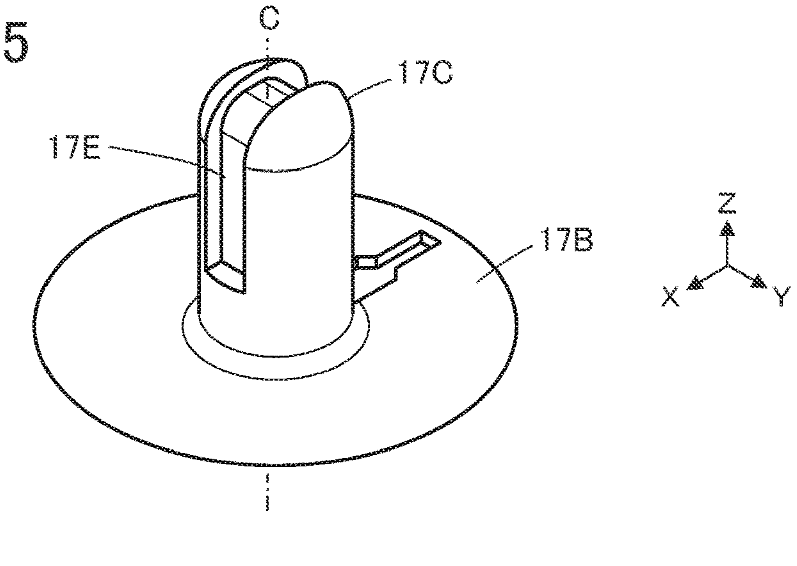
FIG. 5 is a perspective view showing a projection formed at the bottom insulator.

As shown in FIG. 5, the projection 17C formed in the contact arrangement region 17B of the bottom insulator 17 has a substantially columnar shape extending in the Z direction along a fitting axis C of the plug contact 13 disposed to correspond to the contact arrangement region 17B, and an accommodating groove 17E for accommodating the corresponding inner contact 18 is formed at X-directional opposite lateral surfaces and a +Z directional end portion of the projection 17C. The accommodating groove 17E continuously extends in a top surface of the contact arrangement region 17B on the −X direction side of the projection 17C.

The four plug contacts 13 are each made of a conductive material such as metal, and are to be connected to corresponding contacts of a counter connector (not shown) when part of the counter connector is accommodated in the recessed portion 16A of the top insulator 16.

Figure 6:
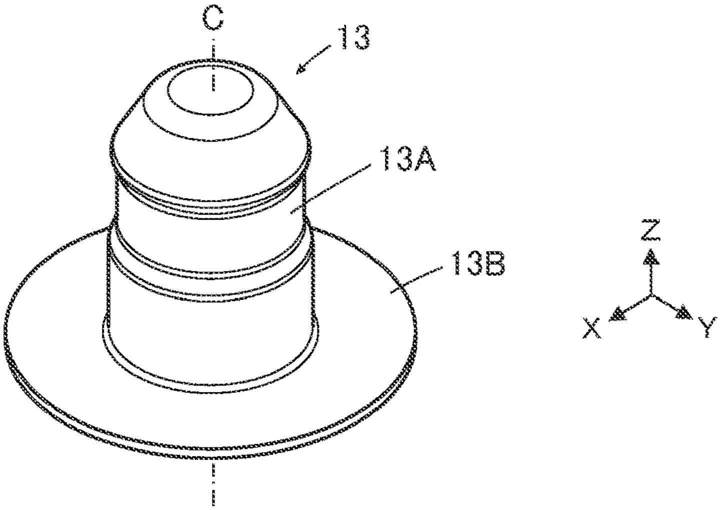
FIG. 6 is a perspective view showing a plug contact used in the connector of Embodiment 1.

As shown in FIG. 6, the plug contact 13 has a tubular portion 13A of cylindrical shape extending in the Z direction along the fitting axis C, and a flange 13B of flat plate shape extending from a −Z directional end portion of the tubular portion 13A along an XY plane. The tubular portion 13A constitutes an axially extending portion, while the flange 13B constitutes an orthogonally extending portion.

Figure 7:
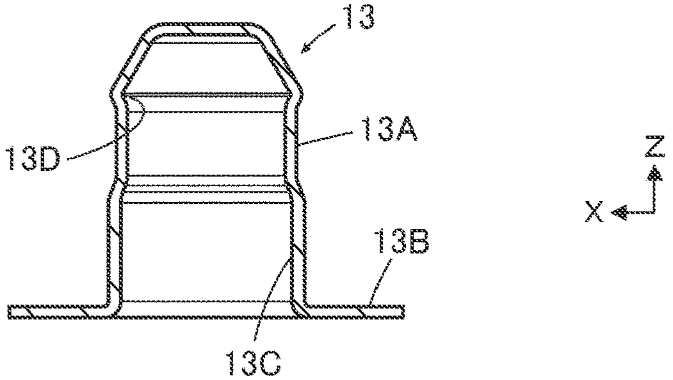
FIG. 7 is a cross-sectional view showing the plug contact used in the connector of Embodiment 1.

As shown in FIG. 7, the tubular portion 13A is provided in its interior with a recessed portion 13C opening in the −Z direction, and the recessed portion 13C is provided in its inside with a receiving portion 13D formed of a dent annularly extending in an XY plane along an inner surface of the recessed portion 13C.

The fitting axis C is an axis passing the center of the tubular portion 13A and extending in the Z direction that is the fitting direction between the connector 11 and a counter connector.

While the tubular portion 13A has a cylindrical shape, the cross-sectional shape thereof is not limited to a circular shape, and the tubular portion 13A may have various cross-sectional shapes such as an elliptical shape and a polygonal shape as long as the tubular portion 13A is provided in its interior with the recessed portion 13C.

All the four plug contacts 13 may be each used as a terminal for transmitting an electric signal.

The sheet type conductive member 15 has a multilayer structure in which a plurality of wiring layers each formed from a conductor and a plurality of insulating layers are laminated.

Figure 8:
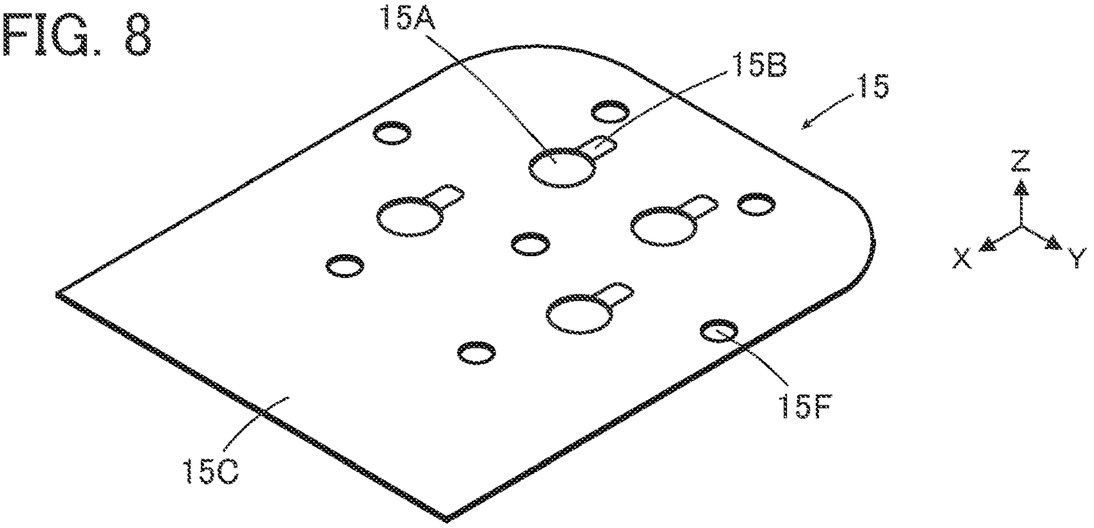
FIG. 8 is a perspective view of the connection object to be connected to the connector of Embodiment 1, as viewed from an obliquely upper position.

As shown in FIG. 8, the sheet type conductive member 15 is provided with four circular opening portions 15A penetrating the sheet type conductive member 15 in the Z direction. The four opening portions 15A separately correspond to the four plug contacts 13. On a top surface, facing in the +Z direction, of the sheet type conductive member 15, a wiring layer 15B is exposed toward the +Z direction so as to be adjacent to the opening portions 15A on the −X direction side of the opening portions 15A, while an insulating layer 15C is exposed in a region other than the regions corresponding to the four opening portions 15A and the four parts of the wiring layer 15B adjacent to these opening portions 15A.

Figure 9:
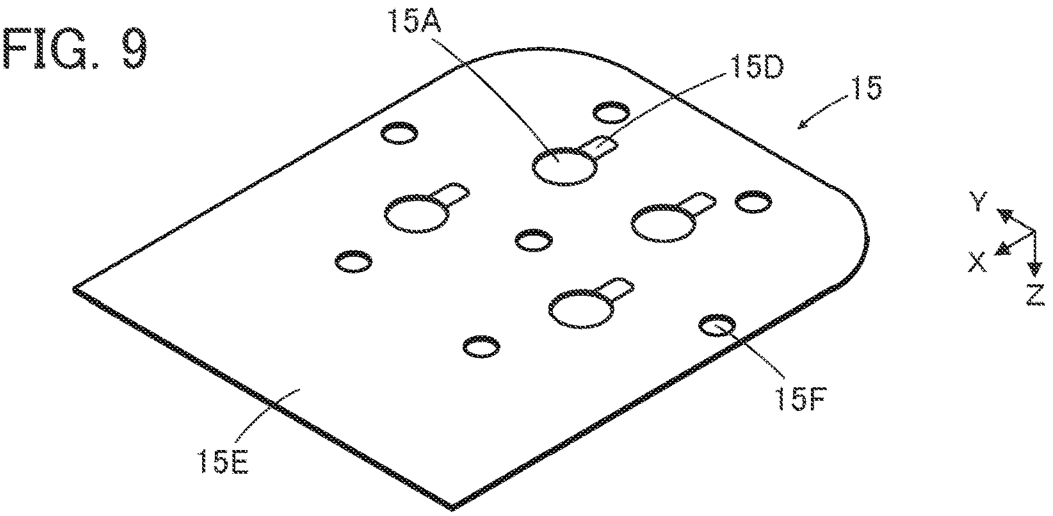
FIG. 9 is a perspective view of the connection object to be connected to the connector of Embodiment 1, as viewed from an obliquely lower position.

Since the opening portions 15A penetrate the sheet type conductive member 15 in the Z direction, as shown in FIG. 9, the four opening portions 15A can be seen also on a bottom surface, facing in the −Z direction, of the sheet type conductive member 15.

On the bottom surface, facing in the −Z direction, of the sheet type conductive member 15, a wiring layer 15D is exposed toward the −Z direction so as to be adjacent to the four opening portions 15A on the X direction side of the opening portions 15A, while an insulating layer 15E is exposed in a region other than the regions corresponding to the four opening portions 15A and the four parts of the wiring layer 15D adjacent to these opening portions 15A.

In addition, as shown in FIGS. 8 and 9, a plurality of through-holes 15F separately corresponding to the plurality of bosses 16C of the top insulator 16 are formed at a peripheral portion of the sheet type conductive member 15.

Figure 10:
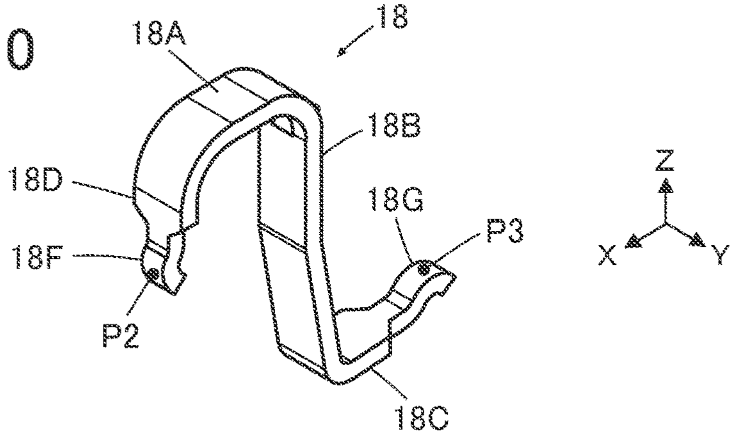
FIG. 10 is a perspective view showing an inner contact used in the connector of Embodiment 1.
Figure 11:
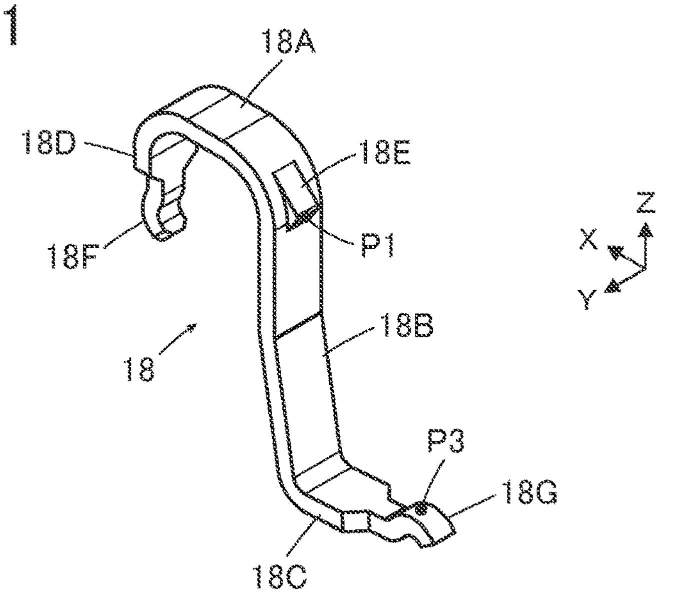
FIG. 11 is a perspective view of the inner contact used in the connector of Embodiment 1, as viewed from an angle different from FIG. 10

As shown in FIGS. 10 and 11, the inner contact 18 is formed of a single band type metal sheet having conductivity and being bent, and has a crossing portion 18A extending in the X direction. A first extending portion 18B extends in the −Z direction from a −X directional end portion of the crossing portion 18A, an arm portion 18C extends in the −X direction from a −Z directional end portion of the first extending portion 18B, and a second extending portion 18D extends in the −Z direction from a +X directional end portion of the crossing portion 18A. The crossing portion 18A, the first extending portion 18B, and the second extending portion 18D are inserted into the recessed portion 13C of the corresponding plug contact 13 when the connector 11 is assembled.

A hook portion 18E projecting in the −X direction is formed at a joint portion between the crossing portion 18A and the first extending portion 18B. The hook portion 18E projects in a right angle shape or a chevron shape toward the −X direction, and a first contacting portion P1 facing in the −Z direction is set at a −X directional end portion of the hook portion 18E.

In addition, a curved portion 18F that is curved to protrude in the +X direction is formed at a −Z directional end portion of the second extending portion 18D, and a second contacting portion P2 facing in the +X direction is set on a +X directional surface of the curved portion 18F.

Further, a curved portion 18G that is curved to protrude toward the +Z direction is formed at a −X directional end portion of the arm portion 18C, and a third contacting portion P3 facing in the +Z direction is set on a +Z directional surface of the curved portion 18G.

Figure 12:
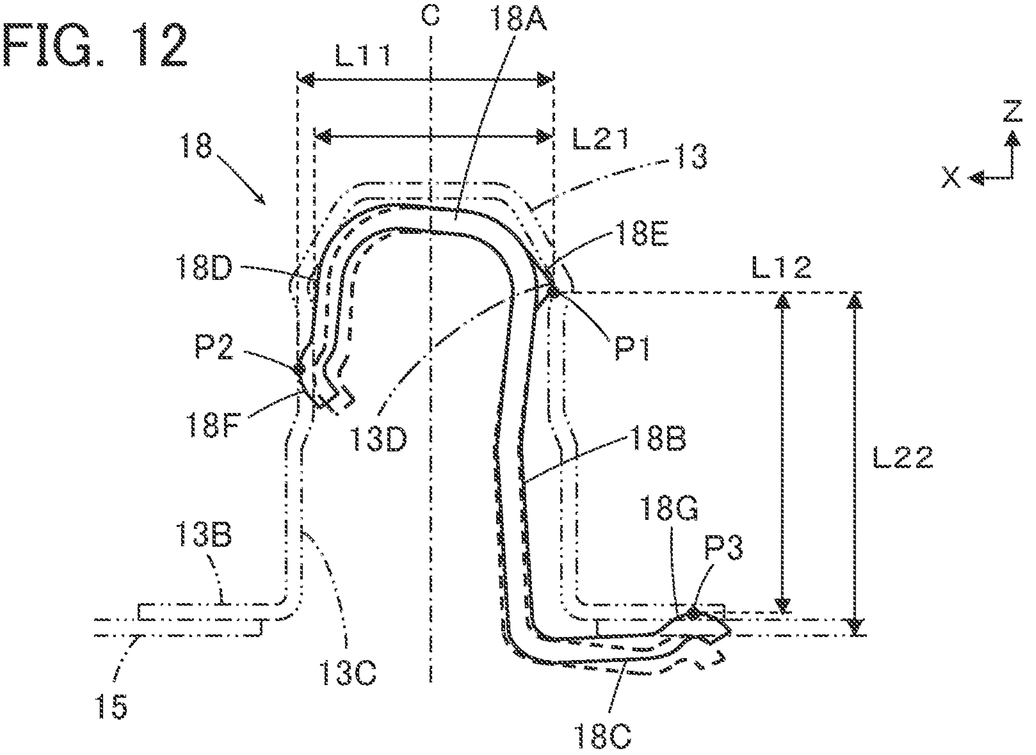
FIG. 12 is a side view showing the inner contact used in the connector of Embodiment 1.

While the position of the inner contact 18 is slightly inclined with respect to the fitting axis C when the crossing portion 18A, the first extending portion 18B, and the second extending portion 18D are inserted in the recessed portion 13C of the plug contact 13 such that the crossing portion 18A crosses the fitting axis C as shown in FIG. 12, in a natural state where no external force is applied to the inner contact 18, a distance L11 in the X direction from the first contacting portion P1 to the second contacting portion P2 is set to be larger than a distance L21 in the X direction from the receiving portion 13D of the plug contact 13 to a part of an inner surface of the recessed portion 13C which part faces the receiving portion 13D.

Similarly, in the natural state where no external force is applied to the inner contact 18, a distance L12 in the Z direction from the first contacting portion P1 to the third contacting portion P3 is set to be smaller than a distance L22 in the Z direction from the receiving portion 13D of the plug contact 13 to the bottom surface of the sheet type conductive member 15 disposed on the −Z direction side of the flange 13B.

Therefore, when the crossing portion 18A, the first extending portion 18B, and the second extending portion 18D are inserted into the recessed portion 13C of the plug contact 13, the inner contact 18 elastically deforms as shown by a dashed line in FIG. 12, the second contacting portion P2 makes contact with the inner surface of the recessed portion 13C of the plug contact 13, and the third contacting portion P3 makes contact with the bottom surface of the sheet type conductive member 15.

The inner contact 18 configured as above can be easily produced by, for example, cutting out a metal sheet into a predetermined shape and then bending the cut metal sheet.

The four contact through-holes 16B of the top insulator 16, the four plug contacts 13, the four opening portions 15A of the sheet type conductive member 15, the four inner contacts 18, and the four contact arrangement regions 17B of the bottom insulator 17 are arranged so as to align with each other in the Z direction.

In addition, the bosses 16C of the top insulator 16, the through-holes 15F of the sheet type conductive member 15, and the through-holes 17D of the bottom insulator 17 are arranged so as to align with each other in the Z direction.

When the connector 11 is assembled, first, the four inner contacts 18 are separately accommodated in the accommodating grooves 17E of the four projections 17C of the bottom insulator 17.

Subsequently, the tubular portions 13A of the plug contacts 13 are inserted into the four contact through-holes 16B of the top insulator 16 correspondingly from the −Z direction, and the bottom insulator 17 is pressed toward the top insulator 16 in the +Z direction with the sheet type conductive member 15 being sandwiched therebetween.

At this time, the inner contact 18 accommodated in the accommodating groove 17E of the projection 17C of the bottom insulator 17 is pushed up in the +Z direction, and the crossing portion 18A, the first extending portion 18B, and the second extending portion 18D of the inner contact 18 are inserted into the recessed portion 13C of the corresponding plug contact 13 through the opening portion 15B of the sheet type conductive member 15. In addition, the flange 13B of the plug contact 13 is situated around the corresponding opening portion 15B of the sheet type conductive member 15, and the sheet type conductive member 15 is sandwiched between the +Z directional surface of the curved portion 18G formed at the −X directional end portion of the arm portion 18C of the inner contact 18 and a bottom surface on the −Z direction side of the flange 13B of the plug contact 13.

Figure 13:
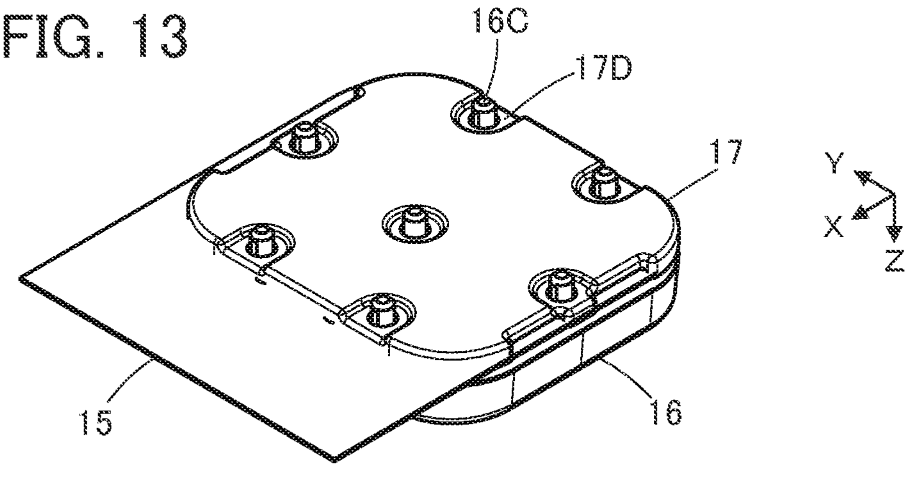
FIG. 13 is a perspective view of the connector in the process of assembling, as viewed from an obliquely lower position.

In addition, by pressing the bottom insulator 17 against the top insulator 16, the bosses 16C of the top insulator 16 sequentially penetrate the through-holes 15F of the sheet type conductive member 15, and the through-holes 17D of the bottom insulator 17. Thereafter, as shown in FIG. 13, the top insulator 16 and the bottom insulator 17 are fixed to each other through heat deformation of a tip of each of the plurality of bosses 16C projecting on the −Z direction side of the bottom insulator 17. Thus, the assembling operation of the connector 11 is completed.

Figure 14:
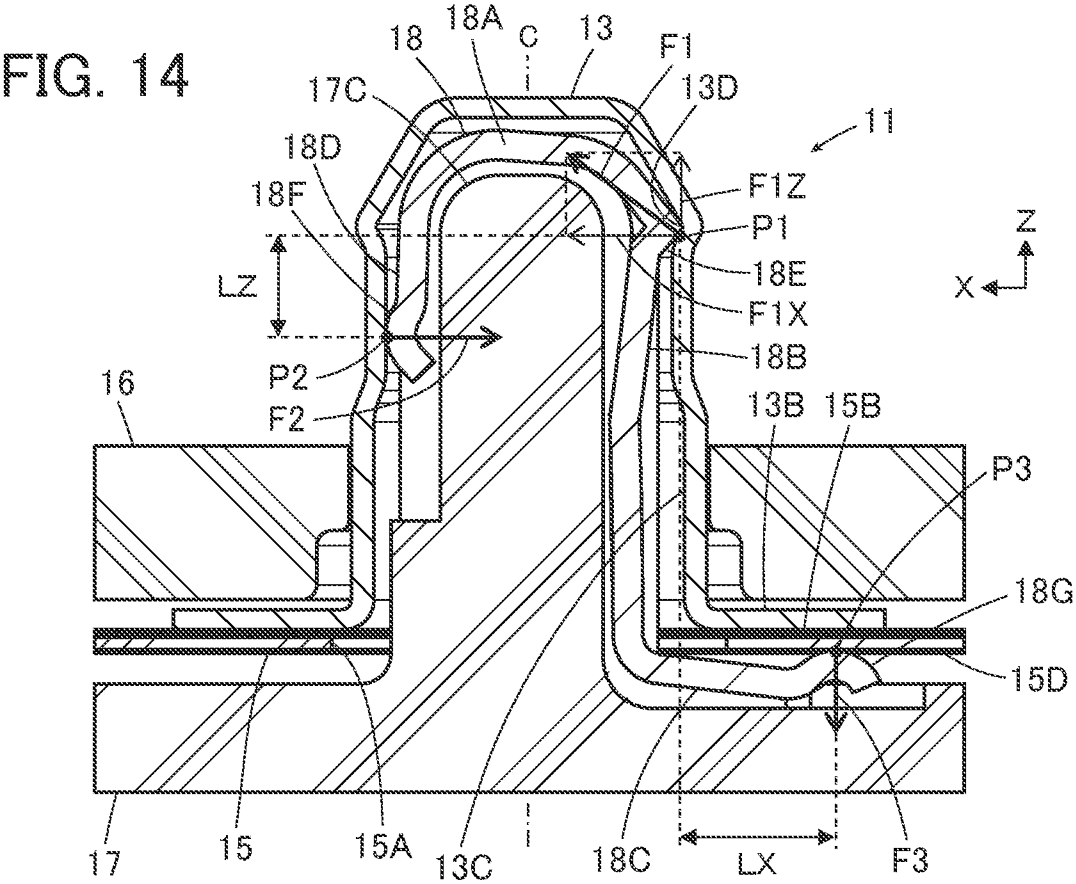
FIG. 14 is a partial cross-sectional side view showing the connector of Embodiment 1 connected to the connection object.

As shown in FIG. 14, when the inner contact 18 is pushed up in the +Z direction by the projection 17C of the bottom insulator 17, the inner contact 18 elastically deforms, the crossing portion 18A, the first extending portion 18B, and the second extending portion 18D move in the +Z direction within the recessed portion 13C of the plug contact 13, and the hook portion 18E is received by the receiving portion 13D formed inside the recessed portion 13C of the plug contact 13.

Here, as shown in FIG. 12, in the natural state where no external force is applied to the inner contact 18, the distance L11 in the X direction from the first contacting portion P1 to the second contacting portion P2 is set to be larger than the distance L21 in the X direction from the receiving portion 13D of the plug contact 13 to a part of the inner surface of the recessed portion 13C which part faces the receiving portion 13D.

Therefore, as shown in FIG. 14, when the crossing portion 18A, the first extending portion 18B, and the second extending portion 18D are inserted into the recessed portion 13C of the plug contact 13, the first contacting portion P1 and the second contacting portion P2 are elastically displaced such that the gap therebetween in the X direction is narrowed, and are pressed against the inner surface of the recessed portion 13C of the plug contact 13.

Specifically, the first contacting portion P1 is pressed against the receiving portion 13D within the recessed portion 13C of the plug contact 13, while the second contacting portion P2 is pressed against the inner surface of the recessed portion 13C of the plug contact 13 on the opposite side from the first contacting portion P1 across the fitting axis C. These first and second contacting portions P1 and P2 are pressed against and makes contact with the inner surface of the recessed portion 13C of the plug contact 13, whereby the inner contact 18 is electrically connected to the plug contact 13.

In addition, as shown in FIG. 12, in the natural state where no external force is applied to the inner contact 18, the distance L12 in the Z direction from the first contacting portion P1 to the third contacting portion P3 is set to be smaller than the distance L22 in the Z direction from the receiving portion 13D of the plug contact 13 to the bottom surface of the sheet type conductive member 15 disposed on the −Z direction side of the flange 13B.

Therefore, as shown in FIG. 14, when the crossing portion 18A, the first extending portion 18B, and the second extending portion 18D are inserted into the recessed portion 13C of the plug contact 13 such that the crossing portion 18A crosses the fitting axis C, the third contacting portion P3 is elastically displaced in the −Z direction and makes contact with the bottom surface of the sheet type conductive member 15 disposed on the −Z direction side of the flange 13B of the plug contact 13. Therefore, the top surface on the +Z direction side of the sheet type conductive member 15 is pressed against the bottom surface of the flange 13B of the plug contact 13, while the bottom surface on the −Z direction side of the sheet type conductive member 15 is pressed against the third contacting portion P3 of the inner contact 18.

Here, as shown in FIGS. 8 and 9, on the top surface of the sheet type conductive member 15, the wiring layer 15B is exposed so as to be adjacent to the opening portions 15A on the −X direction side of the opening portions 15A, and on the bottom surface of the sheet type conductive member 15, the wiring layer 15D is exposed so as to be adjacent to the opening portions 15A on the −X direction side of the opening portions 15A.

Therefore, the wiring layer 15B on the top surface of the sheet type conductive member 15 makes contact with the bottom surface of the flange 13B of the plug contact 13 with predetermined contact pressure, while the wiring layer 15D on the bottom surface of the sheet type conductive member 15 makes contact with the third contacting portion P3 of the inner contact 18 with predetermined contact pressure.

Therefore, the wiring layer 15B exposed on the top surface of the sheet type conductive member 15 is electrically connected to the plug contact 13 directly, and the wiring layer 15D exposed on the bottom surface of the sheet type conductive member 15 is electrically connected to the plug contact 13 via the inner contact 18. In other words, both the wiring layers 15B and 15D are connected to the plug contact 13.

Thus, with the connector 11, both the wiring layer 15B and the wiring layer 15D formed of the conductors disposed on the top surface side and the bottom surface side of the sheet type conductive member 15 can be electrically connected to a single plug contact 13 by use of the inner contact 18.

Therefore, when the connector 11 is connected to a sheet type conductive member having a conductor exposed only on its top surface side, the plug contact 13 can be electrically connected to the conductor on the top surface side of the sheet type conductive member. On the other hand, when the connector 11 is connected to a sheet type conductive member having a conductor exposed only on its bottom surface side, the plug contact 13 can be electrically connected to the conductor on the bottom surface side of the sheet type conductive member.

Further, when the connector 11 is connected to a sheet type conductive member having conductors separately exposed on its top surface side and bottom surface side like the sheet type conductive member 15 in Embodiment 1 above, the plug contact 13 can be electrically connected to both the conductors on the top surface side and the bottom surface side of the sheet type conductive member. For example, assuming that a connection object is a sheet type conductive member having a multilayer structure in which conductors constituting shield layers are separately exposed on the top surface side and the bottom surface side and a conductor constituting a signal wiring layer is disposed between these shield layers so as to be insulated from both the shield layers, a shield effect with respect to the signal wiring layer is exhibited when the plug contact 13 connected to the shield layers on the top surface side and the bottom surface side is connected to a ground potential, and it is possible to carry out highly accurate signal transmission with reduced influence of external disturbances caused by, for example, electromagnetic waves.

Note that the flange 13B of each of the plug contacts 13 is sandwiched between the top insulator 16 and the bottom insulator 17, so that the plug contacts 13 are fixed to the top insulator 16 and the bottom insulator 17.

The first contacting portion P1 and the second contacting portion P2 of the inner contact 18 are elastically displaced such that the gap therebetween in the X direction is narrowed, and make contact with the inner surface of the recessed portion 13C of the plug contact 13, and the third contacting portion P3 is elastically displaced in the −Z direction and makes contact with the bottom surface of the sheet type conductive member 15; therefore, as shown in FIG. 14, the inner contact 18 is retained by the plug contact 13 in the state where: the first contacting portion P1 receives a force F1 acting in the +X direction and the +Z direction from the receiving portion 13D of the recessed portion 13C of the plug contact 13; the second contacting portion P2 receives a force F2 acting in the −X direction from the inner surface of the recessed portion 13C of the plug contact 13; and the third contacting portion P3 receives a force F3 acting in the −Z direction from the bottom surface of the sheet type conductive member 15.

That is, if a frictional force is ignored, these three forces F1, F2 and F3 balance, and when an X directional component force and a Z directional component force of the force F1 are F1X and F1Z, respectively, the following relations are established:

$$F2=F1X \quad (1), \text{ and}$$

$$F3=F1Z \quad (2).$$

Note that F1, F2, F3, F1X, and F1Z are all represented by absolute values.

In addition, from balance of moments about the first contacting portion P1, when a distance in the X direction between the first contacting portion P1 and the third contacting portion P3 is LX, and a distance in the Z direction between the first contacting portion P1 and the second contacting portion P2 is LZ, the following relation is established:

$$(F2\times LZ)=(F3\times LX) \quad (3).$$

From the formulae (1), (2), and (3) above, the following formula can be obtained:

$$(F3/F2)=(F1Z/F1X)=(LZ/LX) \quad (4).$$

Figure 15:
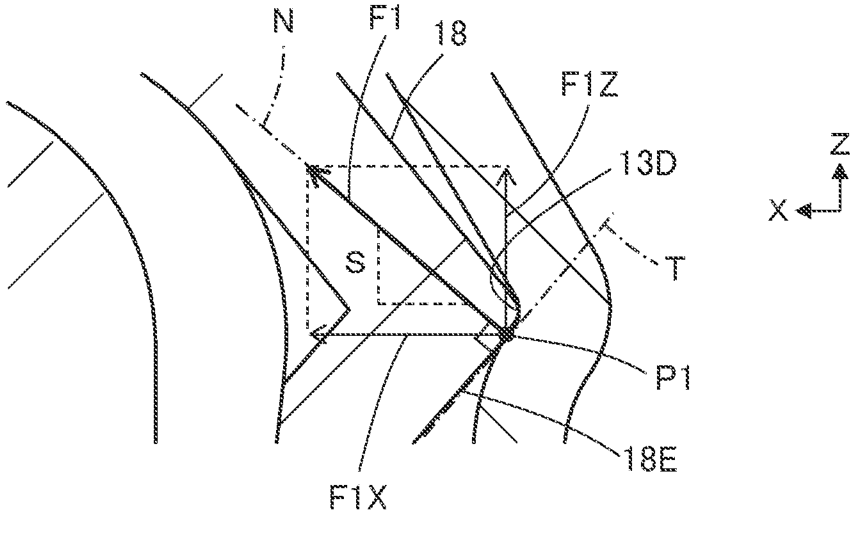
FIG. 15 is an enlarged view of an important part of FIG. 14.

As shown in FIG. 15, a tangential plane formed by the hook portion 18E and the receiving portion 13D contacting each other in the case where the receiving portion 13D of the plug contact 13 receives the hook portion 18E of the inner contact 18 is assumed to be T, and a normal line perpendicular to the tangential plane T is assumed to be N. If a frictional force exerted between the inner contact 18 and the plug contact 13 is ignored, the force F1 along the normal line N is applied from the receiving portion 13D of the plug contact 13 to the first contacting portion P1 set at the −X directional end portion of the hook portion 18E.

That is, a ratio of the Z directional component force F1Z to the X directional component force F1X of the force F1 (F1Z/F1X) is equal to an inclination S of the normal line N.

Thus, the inner contact 18 is supported at three points by the plug contact 13 by means of the first contacting portion P1, the second contacting portion P2, and the third contacting portion P3 in the state where the forces F1, F2, and F3 applied to the inner contact 18 balance and the moments balance.

Here, the case is assumed where, for example, an inner contact that is the same as the inner contact 18 except that a X directional length of the arm portion 18C is larger than that of the inner contact 18 is used instead of the inner contact 18. It is assumed that elastic displacement of the first contacting portion P1 and the second contacting portion P2 is similar to that in the case of the inner contact 18 and that the magnitude of the force F2 applied from the inner surface of the recessed portion 13C of the plug contact 13 to the second contacting portion P2 does not change.

Since the distance LX in the X direction between the first contacting portion P1 and the third contacting portion P3 becomes large according to the length of the arm portion 18C, in order to balance the moments about the first contacting portion P1, from the formula (3) above, the force F3 acting in the −Z direction to be applied to the third contacting portion P3 becomes small, and accordingly, the Z directional component force F1Z of the force F1 is also reduced. On the other hand, since the X directional component force F1X of the force F1 does not change as with the force F2, the ratio (F1Z/F1X) becomes smaller than the inclination S of the normal line N.

However, if the frictional force is ignored, the force F1 along the normal line N is applied, as a perpendicular reaction force from the tangential plane T, to the first contacting portion P1, and a force acting in the +Z direction, which corresponds to the reduction of the Z directional component force F1Z of the force F1, is applied to the first contacting portion P1. As a result, the inner contact 18 is prevented from falling off the plug contact 13 in the −Z direction.

Next, the case is assumed where an inner contact that is the same as the inner contact 18 except that the X directional length of the arm portion 18C is smaller than that of the inner contact 18 is used instead of the inner contact 18. It is assumed that elastic displacement of the first contacting portion P1 and the second contacting portion P2 is similar to that in the case of the inner contact 18 and that the magnitude of the force F2 applied from the inner surface of the recessed portion 13C of the plug contact 13 to the second contacting portion P2 does not change.

Since the distance LX in the X direction between the first contacting portion P1 and the third contacting portion P3 becomes small according to the reduction in the length of the arm portion 18C, in order to balance the moments about the first contacting portion P1, from the formula (3) above, the force F3 acting in the −Z direction to be applied to the third contacting portion P3 becomes large, and accordingly, the Z directional component force F1Z of the force F1 also increases. On the other hand, since the X directional component force F1X of the force F1 does not change as with the force F2, the ratio (F1Z/F1X) becomes larger than the inclination S of the normal line N.

However, if the frictional force is ignored, the force F1 along the normal line N is applied, as a perpendicular reaction force from the tangential plane T, to the first contacting portion P1, and a force acting in the −Z direction, which corresponds to the increase in the Z directional component force F1Z of the force F1 is applied to the first contacting portion P1. As a result, the inner contact 18 easily falls off the plug contact 13 in the −Z direction.

That is, in order for the inner contact 18 to be stably supported at three points by the plug contact 13, the ratio LZ/LX of the distance LZ in the Z direction between the first contacting portion P1 and the second contacting portion P2 to the distance LX in the X direction between the first contacting portion P1 and the third contacting portion P3 is preferably not more than the inclination S with respect to the X direction of the normal line N perpendicular to the tangential plane T formed by the hook portion 18E and the receiving portion 13D contacting each other in the case where the receiving portion 13D receives the hook portion 18E.

Even when a frictional force that cannot be ignored is exerted between the inner contact 18 and the plug contact 13, the inner contact 18 can be stably supported by the plug contact 13 by setting the ratio LZ/LX to be not more than the inclination S of the normal line N.

Embodiment 2

While the receiving portion 13D formed inside the recessed portion 13C of the plug contact 13 receives the hook portion 18E of the inner contact 18 in Embodiment 1 above, the invention is not limited thereto, and a plug contact having no receiving portion 13D may be used by utilizing a static frictional force.

Figure 16:
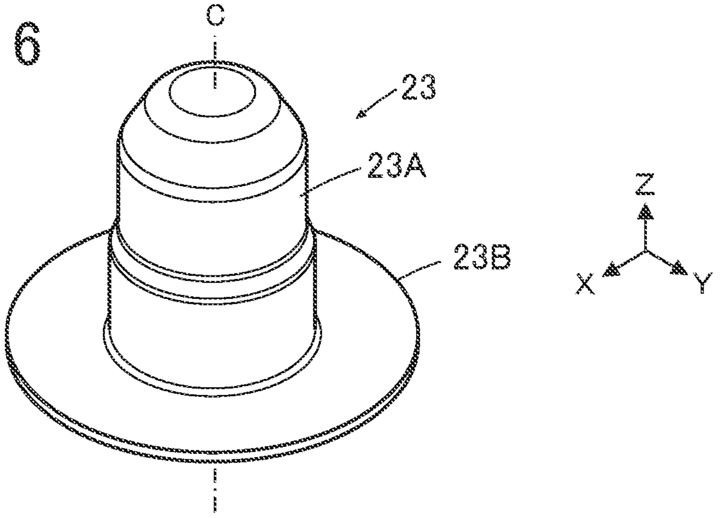
FIG. 16 is a perspective view showing a plug contact used in a connector of Embodiment 2.

FIG. 16 shows a plug contact 23 used in a connector 21 according to Embodiment 2. As with the plug contact 13 in Embodiment 1, the plug contact 23 is made of a conductive material such as metal and has a tubular portion 23A of cylindrical shape and extending in the Z direction along the fitting axis C, and a flange 23B extending from a −Z directional end portion of the tubular portion 23A along an XY plane.

Figure 17:
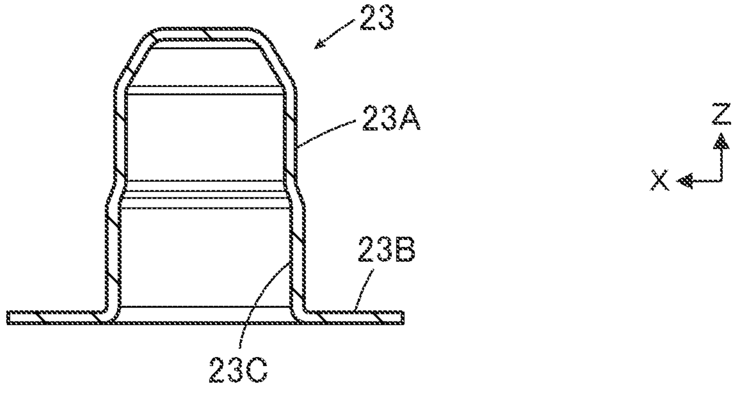
FIG. 17 is a cross-sectional view showing the plug contact used in the connector of Embodiment 2.

As shown in FIG. 17, the tubular portion 23A is provided in its interior with a recessed portion 23C opening in the −Z direction, but the receiving portion formed of the dent included in the plug contact 13 in Embodiment 1 is not formed inside the recessed portion 23C.

Figure 18:
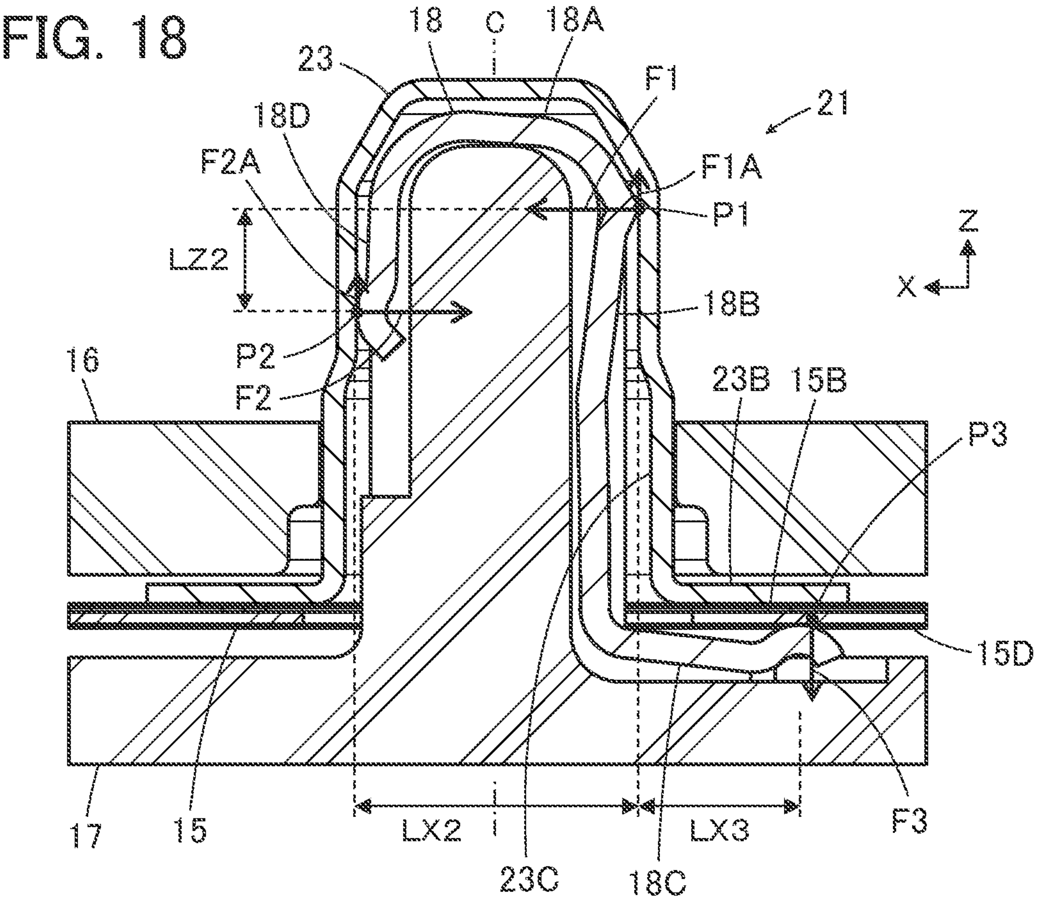
FIG. 18 is a partial cross-sectional side view showing the connector of Embodiment 2 connected to the connection object.

FIG. 18 shows the connector 21 of Embodiment 2 connected to the sheet type conductive member 15. The connector 21 is configured to use the plug contact 23 in place of the plug contact 13 in the connector 11 of Embodiment 1 shown in FIG. 14, and the other members are the same as those of the connector 11 of Embodiment 1.

When the crossing portion 18A, the first extending portion 18B, and the second extending portion 18D of the inner contact 18 are inserted into the recessed portion 23C of the plug contact 23, the first contacting portion P1 and the second contacting portion P2 are elastically displaced such that the gap therebetween in the X direction is narrowed. Thus, a force F1 acting in the +X direction from an inner surface of the recessed portion 23C of the plug contact 23 is applied to the first contacting portion P1, and a force F2 acting in the −X direction from the inner surface of the recessed portion 23C of the plug contact 23 is applied to the second contacting portion P2.

In addition, the third contacting portion P3 set at the tip of the arm portion 18C makes contact with the bottom surface of the sheet type conductive member 15 disposed on the −Z direction side of the flange 23B of the plug contact 23 and is elastically displaced in the −Z direction, and a force F3 acting in the −Z direction from the bottom surface of the sheet type conductive member 15 is applied to the third contacting portion P3.

This force F3 is directed to −Z direction, so that falling off of the inner contact 18 from the plug contact 23 is promoted; however, since the first contacting portion P1 and the second contacting portion P2 make contact with the inner surface of the recessed portion 23C of the plug contact 23 and receive the forces F1 and F2 in the X direction, static frictional forces F1A and F2A acting in the +Z direction are exerted on the first contacting portion P1 and the second contacting portion P2, respectively.

The forces F1, F2, and F3 and the static frictional forces F1A and F2A balance, and in this state, the inner contact 18 is supported at three points by the plug contact 23.

At this time, from balance of the forces, the following relations are established:

$$F1=F2 \quad (5),\ \text{and}$$

$$F3=F1A+F2A \quad (6).$$

Note that F1, F2, F3, F1A, and F2A are all represented by absolute values.

From balance of the moments about the first contacting portion P1, when a distance in the X direction between the first contacting portion P1 and the second contacting portion P2 is LX2, a distance in the X direction between the first contacting portion P1 and the third contacting portion P3 is LX3, and a distance in the Z direction between the first contacting portion P1 and the second contacting portion P2 is LZ2, the following relation is established:

$$(F2\times LZ2)=(F3\times LX3)+(F2A\times LX2) \quad (7).$$

Further, when a static frictional coefficient between the inner surface of the recessed portion 23C of the plug contact 23 and each of the first contacting portion P1 and the second contacting portion P2 of the inner contact 18 is M, the following relations are established:

$$F1A=(M\times F1) \quad (8),\ \text{and}$$

$$F2A=(M\times F2) \quad (9).$$

When the static frictional coefficient M is calculated from the formulae (5) to (9) above, $$M=LZ2/(LX2+2\times LX3) \quad (10).$$

Therefore, when the ratio represented by the distances LX2, LX3, and LZ2 among the first contacting portion P1, the second contacting portion P2, and the third contacting portion P3 [LZ2/(LX2+2×LX3)] is not more than the static frictional coefficient M between the inner surface of the recessed portion 23C of the plug contact 23 and each of the first contacting portion P1 and the second contacting portion P2 of the inner contact 18, the formulae (5) to (9) above are established, and the inner contact 18 is retained by the plug contact 23.

Thus, even when the plug contact 23 having no receiving portion is used, the inner contact 18 can be stably supported at three points by the plug contact 23 without falling off the plug contact 23 in the −Z direction.

In addition, as with the connector 11 of Embodiment 1, also in the connector 21 of Embodiment 2, the first contacting portion P1 and the second contacting portion P2 make contact with the inner surface of the recessed portion 23C of the plug contact 23, and the third contacting portion P3 makes contact with the bottom surface of the sheet type conductive member 15, so that both the wiring layer 15B and the wiring layer 15D respectively disposed on the top surface side and the bottom surface side of the sheet type conductive member 15 can be electrically connected to a single plug contact 23.

Embodiment 3

While the plug contact 13, 23 has the tubular portion 13A, 23A of cylindrical shape in Embodiments 1 and 2 above, the invention is not limited thereto, and a plug contact having no tubular portion may also be used.

Figure 19:
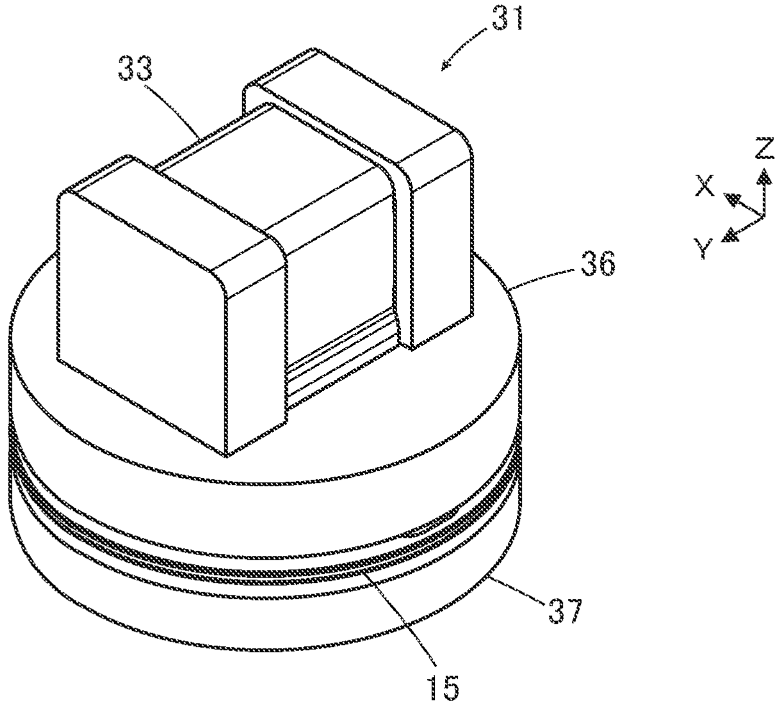
FIG. 19 is a partial perspective view showing a connector according to Embodiment 3 connected to the connection object.

FIG. 19 shows a partial perspective view of a connector 31 according to Embodiment 3. The connector 31 includes a top insulator 36 and a bottom insulator 37 separately disposed on opposite sides in the Z direction of the sheet type conductive member 15 with the sheet type conductive member 15 being sandwiched therebetween, and a plug contact 33 is retained by the top insulator 36.

Figure 20:
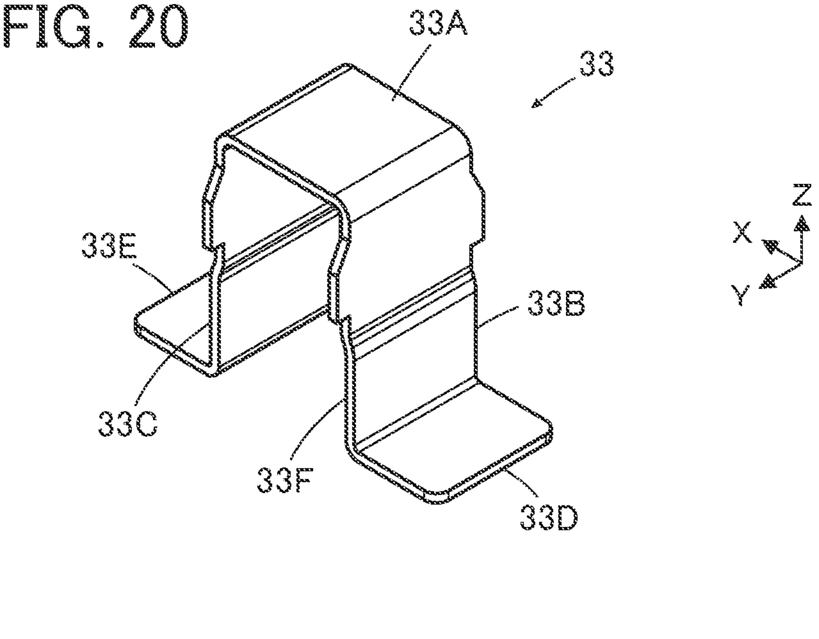
FIG. 20 is a perspective view showing a plug contact used in the connector of Embodiment 3.

As shown in FIG. 20, the plug contact 33 is formed of a bent plate-like member made of a conductive material such as metal and includes a top plate portion 33A of flat plate shape extending along an XY plane. Axially extending portions 33B and 33C extending in the −Z direction along a YZ plane are respectively joined to a −X directional end portion and a +X directional end portion of the top plate portion 33A, an orthogonally extending portion 33D extending in the −X direction along an XY plane is joined to a −Z directional end portion of the axially extending portion 33B, and an orthogonally extending portion 33E extending in the +X direction along an XY plane is joined to a −Z directional end portion of the axially extending portion 33C.

The axially extending portions 33B and 33C face each other in the X direction, and a recessed portion 33F is formed between the axially extending portions 33B and 33C.

This plug contact 33 may be retained by the top insulator 36 by, for example, press-fitting.

Figure 21:
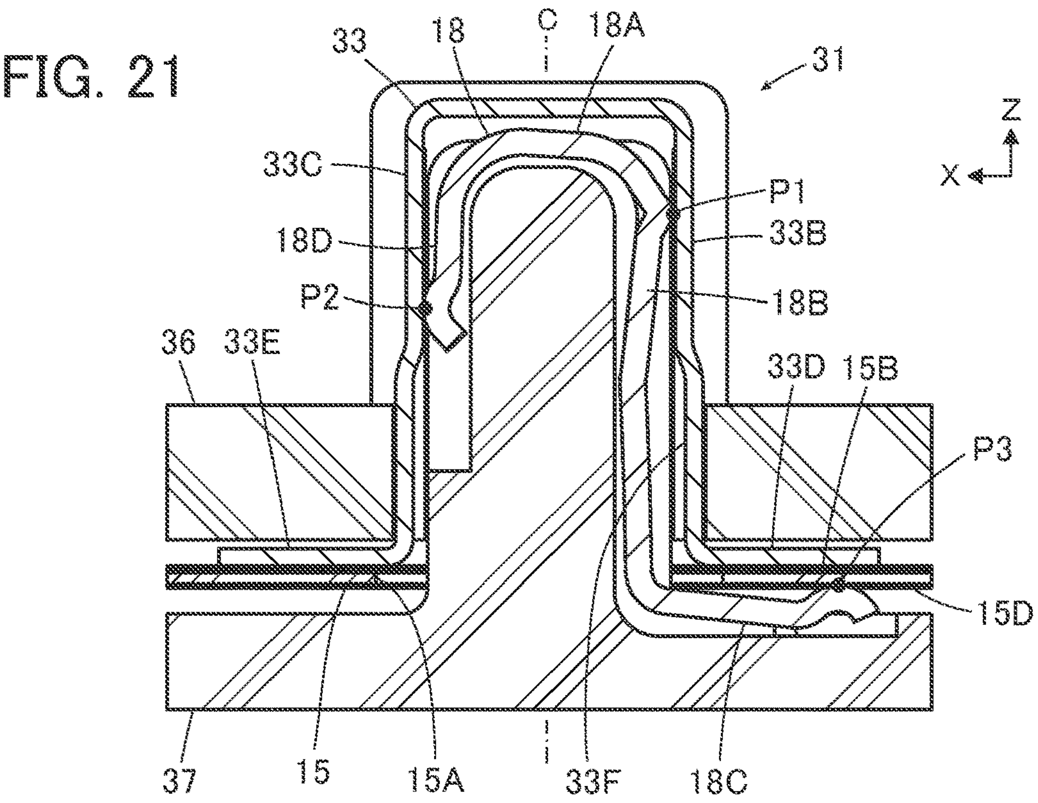
FIG. 21 is a partial cross-sectional side view showing the connector of Embodiment 3 connected to the connection object.

As shown in FIG. 21, the plug contact 33 retained by the top insulator 36 is disposed such that the recessed portion 33F opens in the −Z direction, and the inner contact 18 retained by the bottom insulator 37 is pushed in the +Z direction through the opening portion 15A of the sheet type conductive member 15 with the sheet type conductive member 15 being disposed between the top insulator 36 and the bottom insulator 37, whereby the crossing portion 18A, the first extending portion 18B, and the second extending portion 18D of the inner contact 18 are inserted into the recessed portion 33F of the plug contact 33.

Note that the inner contact 18 is the same as the inner contact 18 used in Embodiments 1 and 2 above.

The first contacting portion P1 and the second contacting portion P2 of the inner contact 18 respectively make contact with the axially extending portions 33B and 33C of the plug contact 33, whereby the inner contact 18 is electrically connected to the plug contact 33, and the third contacting portion P3 is elastically displaced in the −Z direction and makes contact with the bottom surface of the sheet type conductive member 15 disposed on the −Z direction side of the orthogonally extending portion 33D of the plug contact 33.

Consequently, the wiring layer 15B exposed on the top surface of the sheet type conductive member 15 is electrically connected to the plug contact 33 directly, and the wiring layer 15D exposed on the bottom surface of the sheet type conductive member 15 is electrically connected to the plug contact 33 via the inner contact 18. That is, both the wiring layer 15B and the wiring layer 15D disposed on the top surface side and the bottom surface side of the sheet type conductive member 15 can be electrically connected to the single plug contact 33.

In addition, the first contacting portion P1 and the second contacting portion P2 of the inner contact 18 respectively make contact with the axially extending portions 33B and 33C of the plug contact 33, and the third contacting portion P3 makes contact with the bottom surface of the sheet type conductive member 15, whereby the inner contact 18 is supported at three points by the plug contact 33 as with Embodiment 2 above.

Embodiment 4

Figure 22:
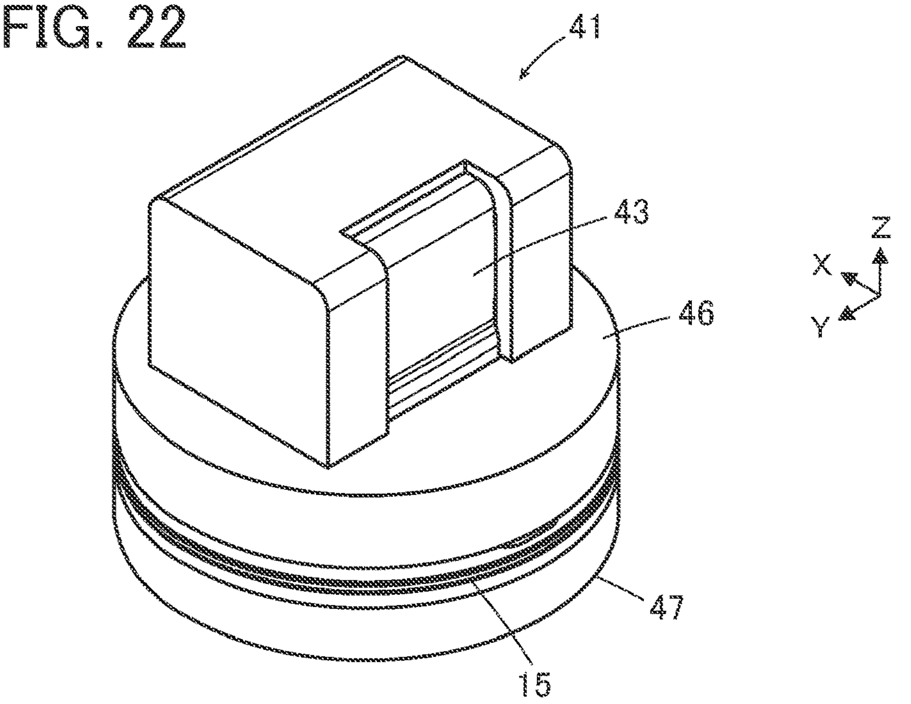
FIG. 22 is a partial perspective view showing a connector according to Embodiment 4 connected to the connection object.

FIG. 22 shows a partial perspective view of a connector 41 according to Embodiment 4. The connector 41 includes a top insulator 46 and a bottom insulator 47 separately disposed on opposite sides in the Z direction of the sheet type conductive member 15 with the sheet type conductive member 15 being sandwiched therebetween, and a plug contact 43 is retained by the top insulator 46.

Figure 23:
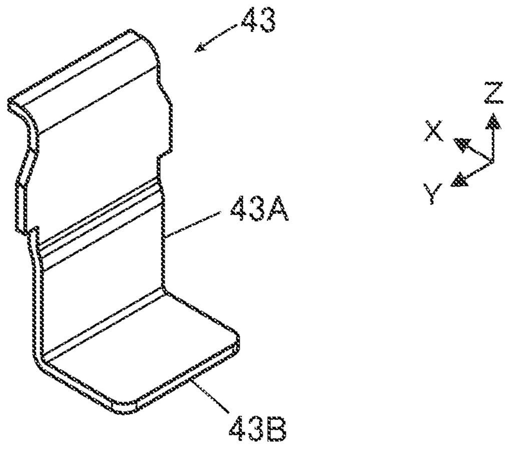
FIG. 23 is a perspective view showing a plug contact used in the connector of Embodiment 4.

As shown in FIG. 23, the plug contact 43 is formed of a bent plate-like member made of a conductive material such as metal and includes an axially extending portion 43A extending along a YZ plane, and an orthogonally extending portion 43B bent at a −Z directional end portion of the axially extending portion 43A and extending in the −Z direction along an XY plane.

This plug contact 43 may be retained by the top insulator 46 by, for example, press-fitting.

Figure 24:
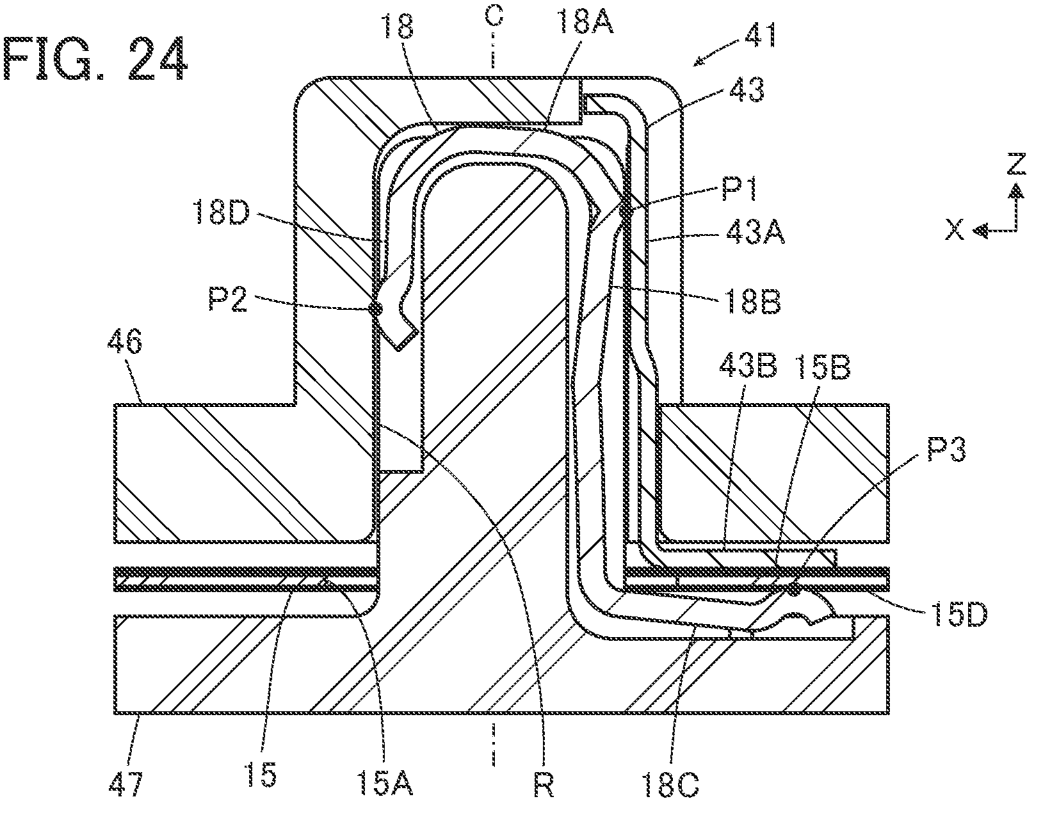
FIG. 24 is a partial cross-sectional side view showing the connector of Embodiment 4 connected to the connection object.
Figure 25:
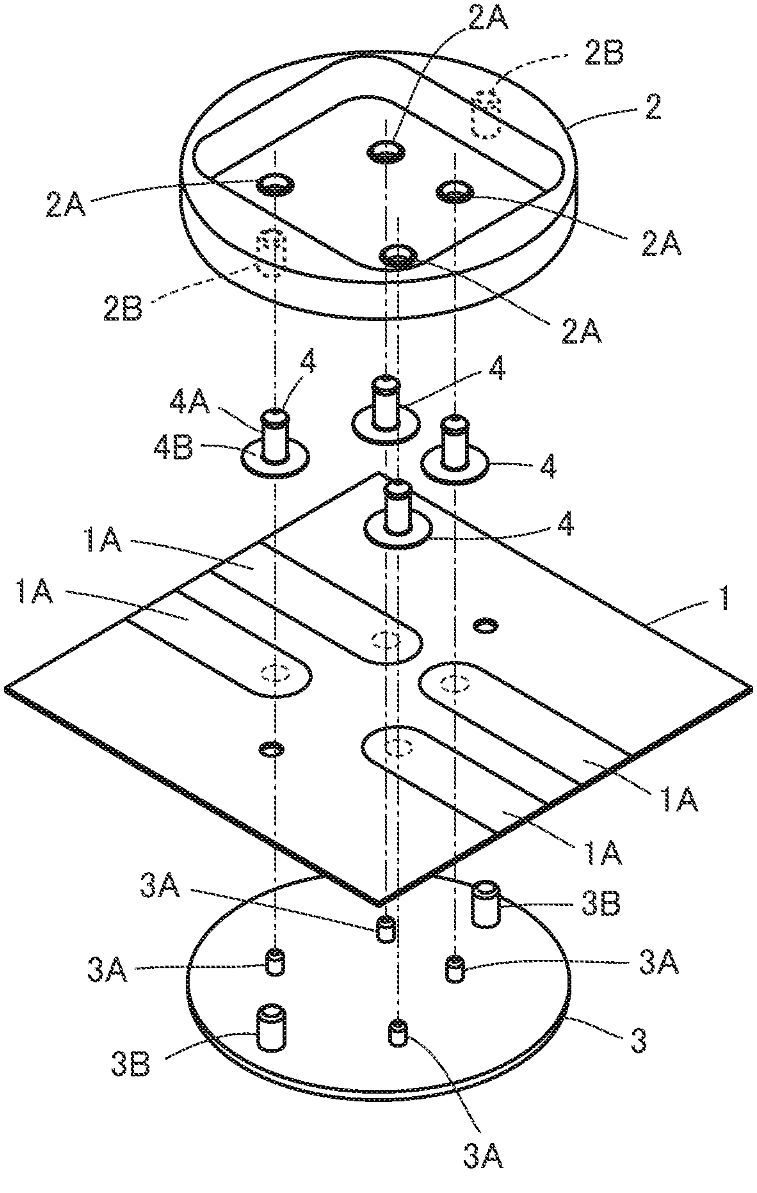
FIG. 25 PRIOR ART
FIG. 25 is an exploded perspective view of a conventional connector.
Figure 26:
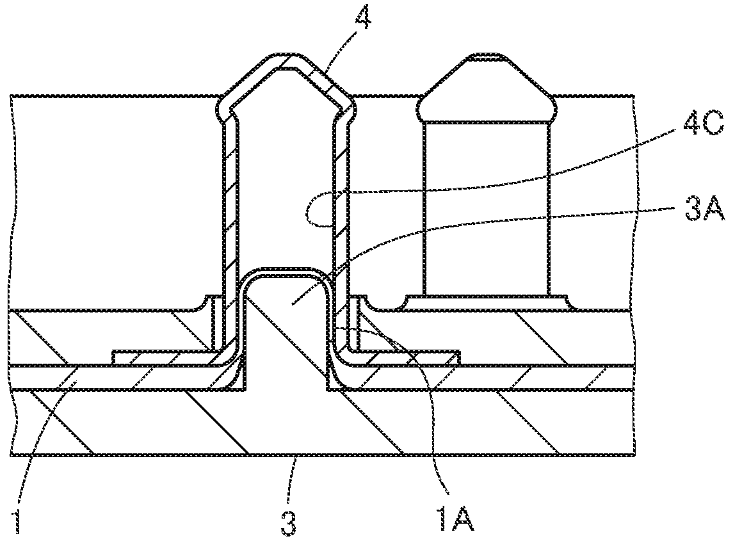
FIG. 26 PRIOR ART
FIG. 26 is a partial cross-sectional view showing the conventional connector.

As shown in FIG. 24, the top insulator 46 which retains the plug contact 43 has a dent facing a +X directional surface of the axially extending portion 43A of the plug contact 43, and the dent of the top insulator 46 and the axially extending portion 43A of the plug contact 43 form a recessed portion R opening in the −Z direction.

The inner contact 18 retained by the bottom insulator 47 is pushed in the +Z direction through the opening portion 15A of the sheet type conductive member 15 with the sheet type conductive member 15 being disposed between the top insulator 46 and the bottom insulator 47, whereby the crossing portion 18A, the first extending portion 18B, and the second extending portion 18D of the inner contact 18 are inserted into the recessed portion R.

The first contacting portion P1 of the inner contact 18 makes contact with the +X directional surface of the axially extending portion 43A of the plug contact 43, whereby the inner contact 18 is electrically connected to the plug contact 43, and the third contacting portion P3 is elastically displaced in the −Z direction and makes contact with the bottom surface of the sheet type conductive member 15 disposed on the −Z direction side of the orthogonally extending portion 43B of the plug contact 43.

Consequently, the wiring layer 15B exposed on the top surface of the sheet type conductive member 15 is electrically connected to the plug contact 43 directly, and the wiring layer 15D exposed on the bottom surface of the sheet type conductive member 15 is electrically connected to the plug contact 43 via the inner contact 18. That is, both the wiring layer 15B and the wiring layer 15D disposed on the top surface side and the bottom surface side of the sheet type conductive member 15 can be electrically connected to a single plug contact 43.

In addition, the first contacting portion P1 of the inner contact 18 makes contact with the axially extending portion 43A of the plug contact 43, the second contacting portion P2 makes contact with the surface of the dent of the top insulator 46 which dent forms part of the recessed portion R, and the third contacting portion P3 makes contact with the bottom surface of the sheet type conductive member 15, whereby the inner contact 18 is supported with respect to the plug contact 43.

While the plug contact 33, 34 in Embodiments 3 and 4 above does not have any receiving portion formed of a dent, as with the plug contact 13 in Embodiment 1, the axially extending portion 33B of the plug contact 33 or the axially extending portion 43A of the plug contact 43 may be provided with a receiving portion formed of a dent so that the receiving portion receives the hook portion 18E of the inner contact 18.

In Embodiments 1 to 4 above, when the inner contact 18 is accommodated in the recessed portion 13C, 23C, 33F, R on the plug contact 13, 23, 33, 43 side, the first contacting portion P1 and the second contacting portion P2 of the inner contact 18 are elastically displaced such that the gap therebetween in the X direction is narrowed, but the portions P1 and P2 need not necessarily be elastically displaced. Even when the first contacting portion P1 and the second contacting portion P2 are not elastically displaced, a force in a direction along the fitting axis C is applied to the third contacting portion P3, whereby a force in a direction orthogonal to the fitting axis C is applied to the first contacting portion P1 and the second contacting portion P2 such that the moments balance, and thus the inner contact 18 is supported.

While the plug contact 13, 23, 33, 43 is connected to both the wiring layer 15B and the wiring layer 15D respectively exposed on the top surface side and the bottom surface side of the sheet type conductive member 15 in Embodiments 1 to 4 above, only the wiring layer 15D exposed on the bottom surface side of the sheet type conductive member 15 may be connected to the plug contact 13, 23, 33, 43, for instance.

While the sheet type conductive member 15 used in Embodiments 1 to 4 above has a multilayer structure, the invention is not limited thereto, and it suffices if the sheet type conductive member has a conductor exposed on at least one surface thereof.

In addition, while the two layers of the conductors, i.e., the wiring layer 15B and the wiring layer 15D of a sheet type conductive member 15, are connected to a single plug contact 13, 23, 33, 43 in Embodiments 1 to 4 above, the invention is not limited thereto, and three or more layers of conductors may be connected to a single plug contact 13, 23, 33, 43.

In addition, while the connector 11 according to Embodiment 1 above has the four plug contacts 13, the invention is not limited to this number of the plug contacts 13, and it suffices if the connector includes at least a single plug contact 13 to be electrically connected to a conductor exposed on at least one surface of the sheet type conductive member 15.

Further, as with Embodiment 1, the connector 21, 31, 41 according to Embodiments 2 to 4 above may have four plug contacts 23, 33, 43.

What is claimed is:

1. A connector comprising:

a plug contact having conductivity and including an axially extending portion that forms at least part of an inner surface of a recessed portion extending along a fitting axis, and an orthogonally extending portion joined to the axially extending portion and extending from a base end of the recessed portion in a direction orthogonal to the fitting axis; and an inner contact having conductivity that is elastically deformable and is supported in a state of being partially inserted in the recessed portion, wherein the inner contact includes: a first contacting portion that makes contact with the inner surface of the recessed portion formed by the axially extending portion and is electrically connected to the plug contact; a second contacting portion that makes contact with the inner surface of the recessed portion on an opposite side from the first contacting portion across the fitting axis at a position closer to the base end of the recessed portion than the first contacting portion; and a third contacting portion extending in a direction orthogonal to the fitting axis and facing the orthogonally extending portion, and wherein part of a connection object of sheet shape having a conductor exposed on at least one surface of the connection object is sandwiched between a bottom surface of the orthogonally extending portion of the plug contact and the third contacting portion of the inner contact in a direction along the fitting axis, the bottom surface of the orthogonally extending portion makes contact with a top surface of the connection object, and the third contacting portion makes contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

2. The connector according to claim 1, wherein the inner contact is formed of a single band type metal sheet being bent, the second contacting portion is disposed at one end of the band type metal sheet, the third contacting portion is disposed at another end of the band type metal sheet, and the first contacting portion is disposed between the one end and the another end of the band type metal sheet.

3. The connector according to claim 2, wherein the inner contact includes:

a crossing portion extending across the fitting axis in a direction orthogonal to the fitting axis;

a first extending portion extending along the fitting axis from one end of the crossing portion toward the base end of the recessed portion;

an arm portion extending from a tip of the first extending portion in a direction orthogonal to the fitting axis; and a second extending portion extending along the fitting axis from another end of the crossing portion toward the base end of the recessed portion, wherein the first contacting portion is disposed at a joint portion between the crossing portion and the first extending portion, wherein the second contacting portion is disposed at a tip of the second extending portion, and wherein the third contacting portion is disposed at a tip of the arm portion.

4. The connector according to claim 1, wherein the inner contact is supported at three points by the plug contact by means of the first contacting portion, the second contacting portion, and the third contacting portion.

5. The connector according to claim 1, wherein the inner contact includes a hook portion projecting in a direction orthogonal to the fitting axis, the first contacting portion being disposed at a tip of the hook portion, and wherein the plug contact includes a receiving portion formed inside the recessed portion and receiving the hook portion.

6. The connector according to claim 5, wherein a ratio LZ/LX of a distance LZ in a direction along the fitting axis between the first contacting portion and the second contacting portion to a distance LX in a direction orthogonal to the fitting axis between the first contacting portion and the third contacting portion is not more than an inclination S of a normal line with respect to a direction orthogonal to the fitting axis, the normal line being perpendicular to a tangential plane formed by the hook portion and the receiving portion contacting each other in a case where the receiving portion receives the hook portion.

7. The connector according to claim 1, comprising a bottom insulator having a projection inserted in the recessed portion, wherein the projection has an accommodating groove to accommodate the inner contact.

8. The connector according to claim 1, wherein the plug contact includes a tubular portion extending along the fitting axis and provided in its interior with the recessed portion, and a flange extending from a base end of the tubular portion in a direction orthogonal to the fitting axis, wherein the axially extending portion is constituted of the tubular portion, and wherein the orthogonally extending portion is constituted of the flange.

9. The connector according to claim 8, comprising a top insulator provided with a contact through-hole that is penetrated by the tubular portion of the plug contact and is smaller than the flange.

10. The connector according to claim 1, wherein the plug contact is formed of a plate-like member being bent.

11. The connector according to claim 10, wherein the plug contact includes a pair of the axially extending portions facing each other across the fitting axis in a direction orthogonal to the fitting axis, wherein the recessed portion is formed between the pair of the axially extending portions, wherein the first contacting portion makes contact with one of the pair of the axially extending portions, and wherein the second contacting portion makes contact with another of the pair of the axially extending portions.

12. The connector according to claim 10, comprising a top insulator retaining the plug contact, wherein the recessed portion is formed of the axially extending portion of the plug contact and the top insulator, and wherein the second contacting portion makes contact with the top insulator which forms part of the recessed portion.

* * * * *